Nov. 22, 1927.

J. H. SPANGLER 1,649,993

CLUTCH

Filed May 4, 1925   3 Sheets-Sheet 2

Inventor:
J. H. Spangler,
By Whiteley and Ruckman
Attorneys.

Nov. 22, 1927. 1,649,993
J. H. SPANGLER
CLUTCH
Filed May 4, 1925  3 Sheets-Sheet 3
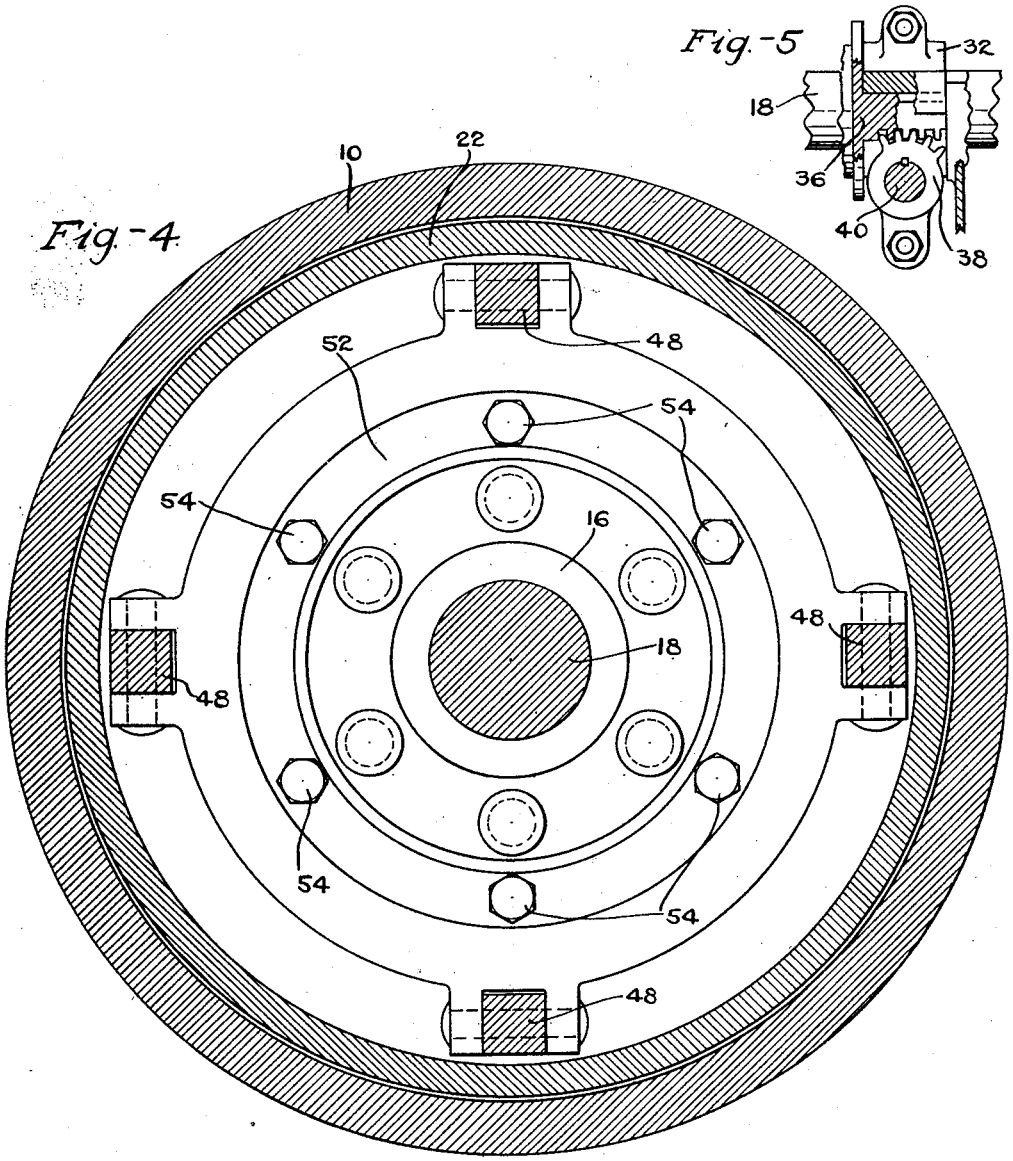
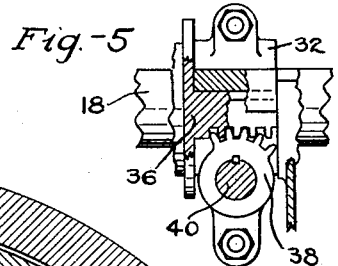
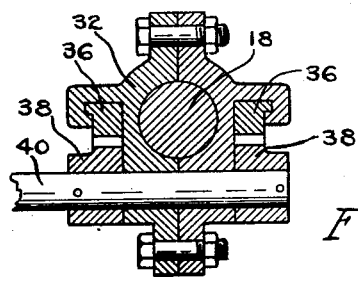
Inventor:
J. H. Spangler
By Whiteley and Ruckman
Attorneys.

Patented Nov. 22, 1927.

1,649,903

UNITED STATES PATENT OFFICE.

JOHN H. SPANGLER, OF MINNEAPOLIS, MINNESOTA.

CLUTCH.

Application filed May 4, 1925. Serial No. 27,763.

My invention relates to clutches and more particularly to frictional gripping cone clutches. An object of the invention is to provide a clutch of this kind having two coned clutch members, one of which is movable into engagement with the other by internal levers which hold the two members in clutching engagement by strong gripping action so that while momentary slipping is permitted while the members are being brought into engagement, after they are fully engaged, they will be firmly held together without liability of slipping.

The full objects and advantages of my invention will appear in connection with the detailed description thereof and the novel features embodied in my inventive idea will be particularly pointed out in the claims.

Figure 1:
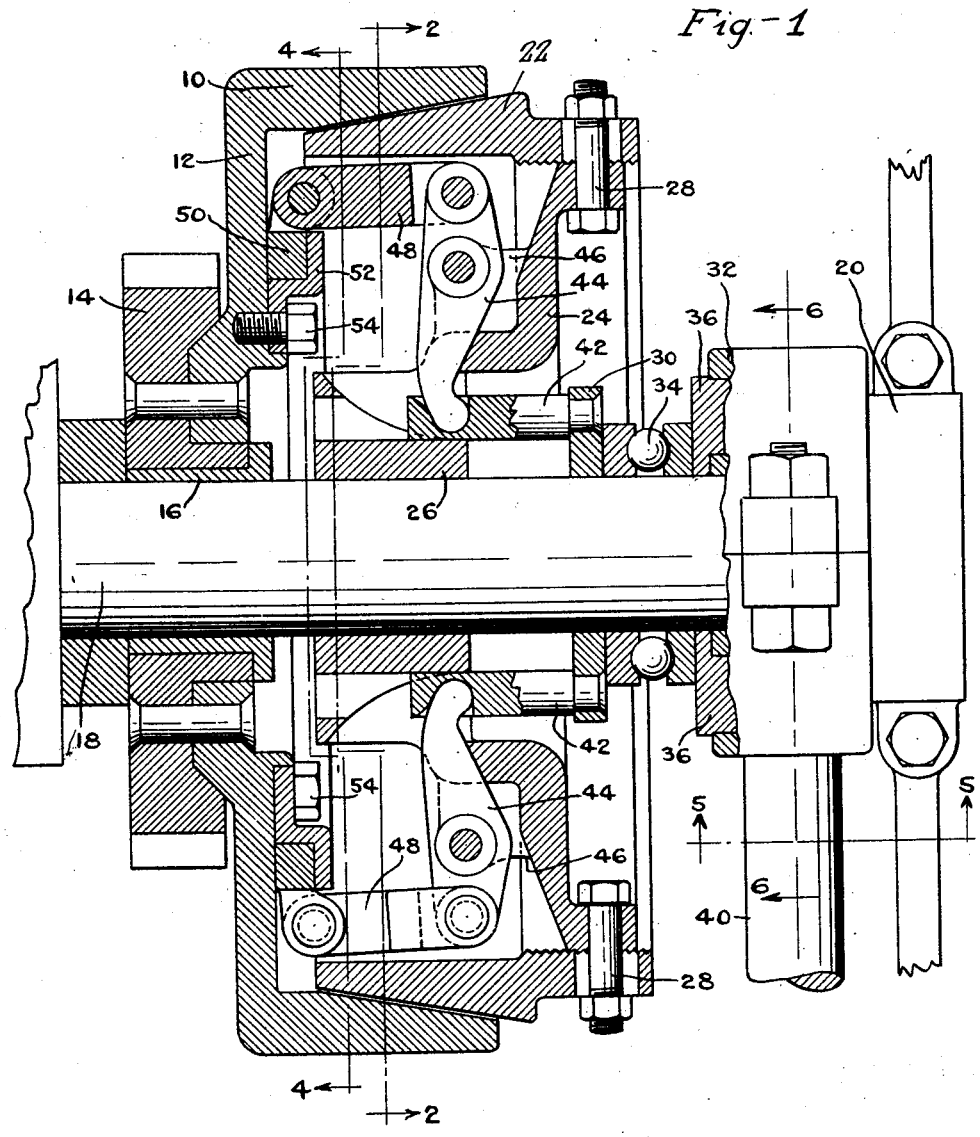
Figure 2:
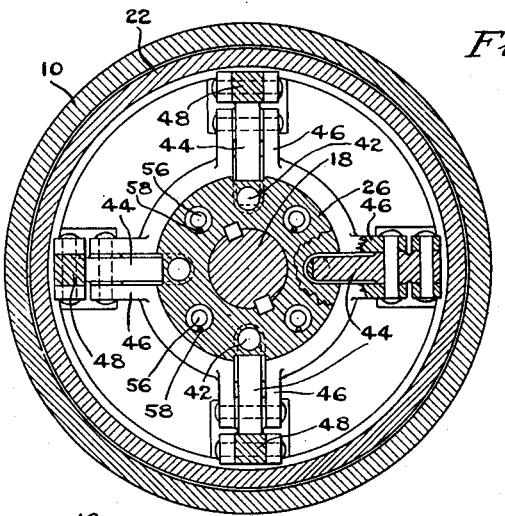
Figure 3:
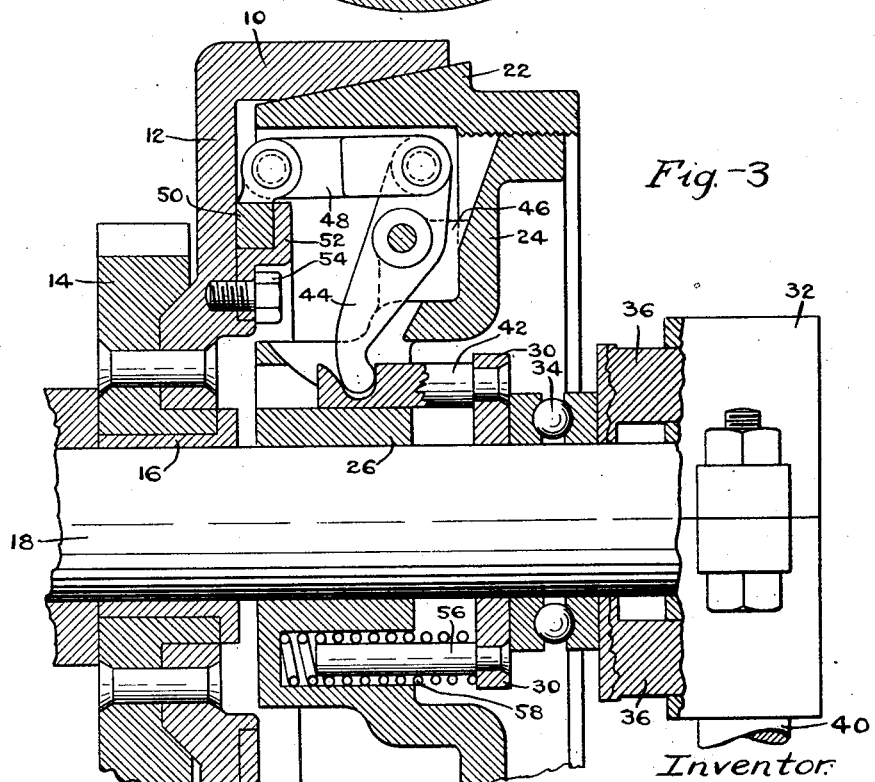

In the accompanying drawings which show one form in which my invention may be embodied, Fig. 1 is a view of the clutch mostly in longitudinal section. Fig. 2 is a view on a reduced scale as compared with the other figures and is in cross section on the line 2—2 of Fig. 1. Fig. 3 is a view similar to Fig. 1 but showing the clutch operated. Fig. 4 is a view in cross section on the line 4—4 of Fig. 1. Fig. 5 is a view in section on the line 5—5 of Fig. 1. Fig. 6 is a view in section on the line 6—6 of Fig. 1.

The drive member of the clutch consists of a drum having a rim 10 and an annulus 12 to the outer margin of which the rim 10 is attached so as to extend out from one side thereof. The inner margin of the annular member in the embodiment shown is secured to a gear 14 rotatably mounted on a bushing 16 surrounding a shaft 18 rotatable in a bearing 20. It will be understood that the drive member 10 of the clutch can be rotated in any suitable manner as by means of a gear meshing with the gear 14. The rim 10 is exteriorly cylindrical and its inner surface is coned for co-operation with the outer coned surface of the driven clutch member which consists of a rim 22 threaded upon the periphery of a flanged annular member 24 having a hub 26 splined on the shaft 18. The clutch rim 22 as shown in Fig. 1 is provided with a number of slots through which bolts 28 pass, these bolts also passing through holes in the threaded member 24 so that adjustment of the clutch member may be made and the parts securely held together in their adjusted position. Mounted on the shaft 18 are two spaced thrust members 30 and 32 between which is a ball-bearing device 34. The member 30 rotates with the shaft 18 and with the hub 26, while the member 32 is stationary so that the shaft 18 rotates therein. As best shown in Fig. 6, the member 32 slidably supports a pair of rack bars 36 which engage segmental gears 38 secured to a rock shaft 40 which may be rocked in any suitable manner. The forward ends of the rack bars 36 engage a disk which forms part of the ball bearing device 34 so that thrust exerted by the rack bars will be communicated to the member 30 in order to bring the clutch member 22 into clutching engagement with the clutch member 10 as shown in Fig. 3 by means of lever mechanism now to be described. A number of studs 42 project forwardly from the member 30 and fit slidably in channels in the hub 26. These studs near their forward ends are provided with rounded depressions into which fit the rounded inner ends of radially arranged levers 44 which are intermediately pivoted to ears 46 carried by the front face of the member 24, the pivot being so located that the inner arms of the levers are considerably longer than the outer arms thereof whereby a powerful leverage is obtained. The outer ends of the levers 44 are pivotally connected to the rear ends of links 48 whose front ends are pivotally attached to the annulus 12 in suitable manner as by being attached to a ring 50 held in place by a flanged annular member 52 which in turn is attached to the disk 12 by bolts 54. When the studs 42 are moved forwardly, the clutch member 22 will be drawn into clutching engagement with the clutch member 10. In order to normally hold the thrust member 30 rearwardly, it is provided with a number of pins 56 which project from its front face, these pins being encircled by coiled springs 58 which bear against the member 30 at their rear ends and at their front ends extend into recesses in the hub 26. When the shaft 40 is rocked in reverse direction, the rack bars 36 are moved from the position shown in Fig. 3 back into the position shown in Fig. 1. The springs 58 then immediately cause the member 30 to move back from the position shown in Fig. 3 into that shown in Fig. 1 so that the levers 44 are operated to bring the member 22 out of clutching engagement with the member 10.

The operation and advantages of my invention will be obvious in connection with the foregoing description. The clutch members are normally held separated in the position shown in Fig. 1 by the springs 58. When the operator moves the thrust member 30 into the position shown in Fig. 3, the levers 44 are operated to slide the member 22 and bring the coned surfaces of the two clutch members into engagement with each other. Before the clutch members become fully engaged, slipping is permitted so that the rotation of the drive member is gradually imparted to the driven member without the occurrence of shocks and jerks. When the levers have been fully operated, the clutching members are firmly held together by a powerful leverage which prevents slipping except in the case of an extremely heavy load.

I claim—

1. A clutch comprising a rotatably mounted drive member, said drive member having an interiorly coned rim, a driven member, a shaft upon which said driven member is slidably mounted, said driven member having a coned rim for co-operation with said first-mentioned coned rim, a plurality of levers intermediately pivoted to the interior of said driven member, links connecting the outer ends of said levers to said drive member, a thrust member slidably mounted on said shaft, studs projecting from said thrust member and engaging the inner ends of said levers, a fixed thrust member within which said shaft is rotatably mounted, rack bars slidably mounted in said fixed thrust member, and means for sliding said rack bars for exerting thrust upon said slidable thrust member to slide said driven member.

2. A clutch comprising a rotatably mounted drive member, said drive member having an interiorly coned rim, a shaft, a driven member consisting of an exteriorly coned rim and an annular member having a channelled and recessed hub slidably mounted on said shaft, said exteriorly coned rim being adapted to co-operate with said interiorly coned rim, a plurality of levers intermediately pivoted to the interior of said driven member, links connecting the outer ends of said levers to said drive member, a thrust member slidably mounted on said shaft, a plurality of studs projecting from said thrust member and fitting slidably in the channels in said hub for engagement with the inner ends of said levers, means for moving said thrust member for operating the levers and sliding said driven member into engagement with said drive member, a plurality of pins projecting from said thrust member, and coiled springs encircling said pins, said springs at one end engaging the bottoms of the recesses in said hub and at the other end engaging said thrust member whereby the two clutch members are normally separated from each other.

3. A clutch comprising a rotatably mounted drive member, said drive member having an interiorly coned rim, a shaft, a driven member consisting of an exteriorly coned rim and an annular member having a hub slidably mounted on said shaft, said exteriorly coned rim being adapted to co-operate with said interiorly coned rim and having screw-threaded engagement with said annular member for adjusting purposes, means for holding said annular member and said rim in their relatively adjusted positions, a plurality of levers intermediately pivoted to said annular member, links connecting the outer ends of said levers to said drive member, and means engaging the inner ends of said levers for operating the levers and sliding said driven member.

In testimony whereof I hereunto affix my signature.

JOHN H. SPANGLER.